May 16, 1961 C. E. FRANTZ ET AL 2,983,989
BROACHING AND TUBE-INSTALLING APPARATUS
Filed July 6, 1959 2 Sheets-Sheet 1
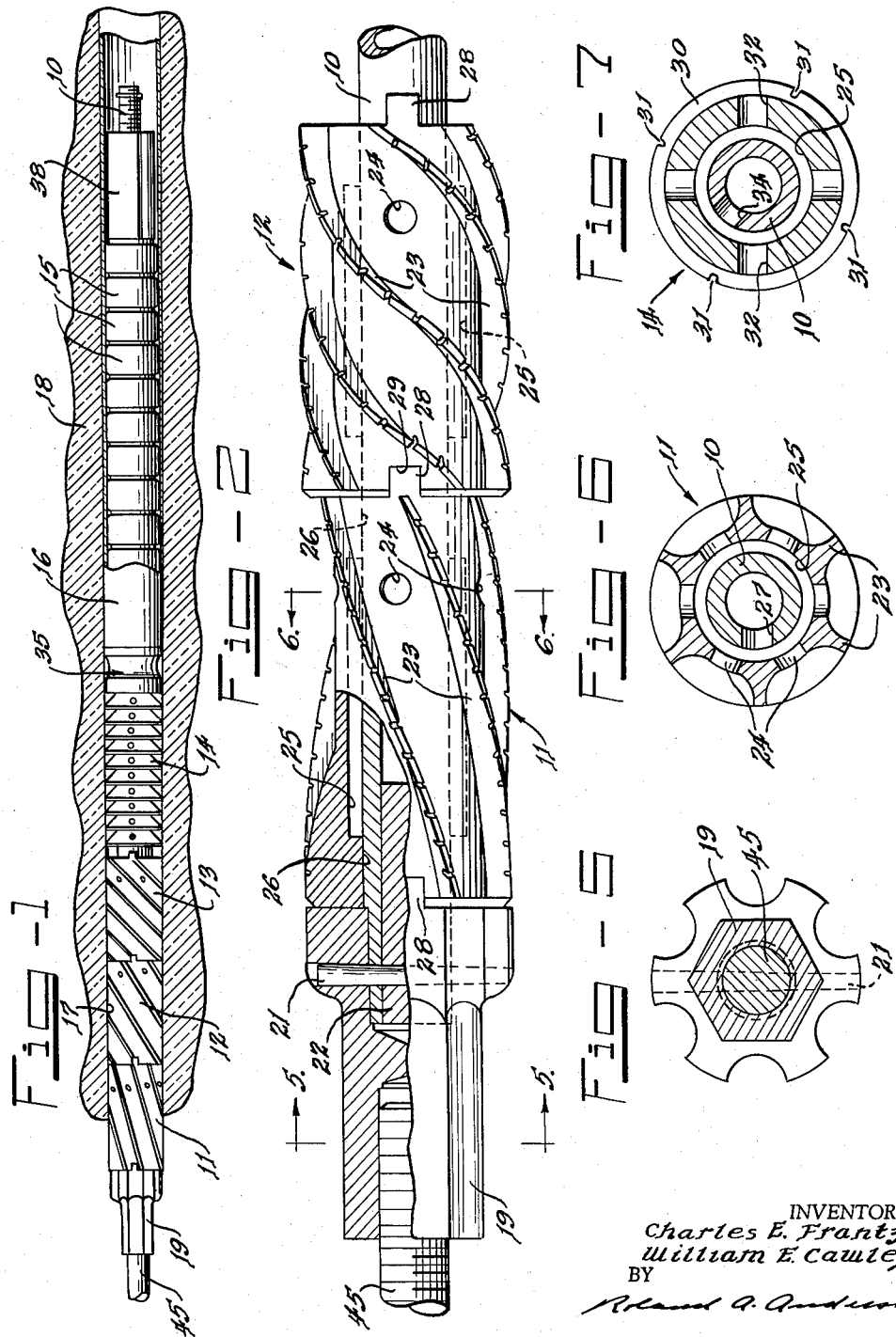
INVENTORS
Charles E. Frantz
William E. Cawley
BY
Roland A. Anderson
Attorney

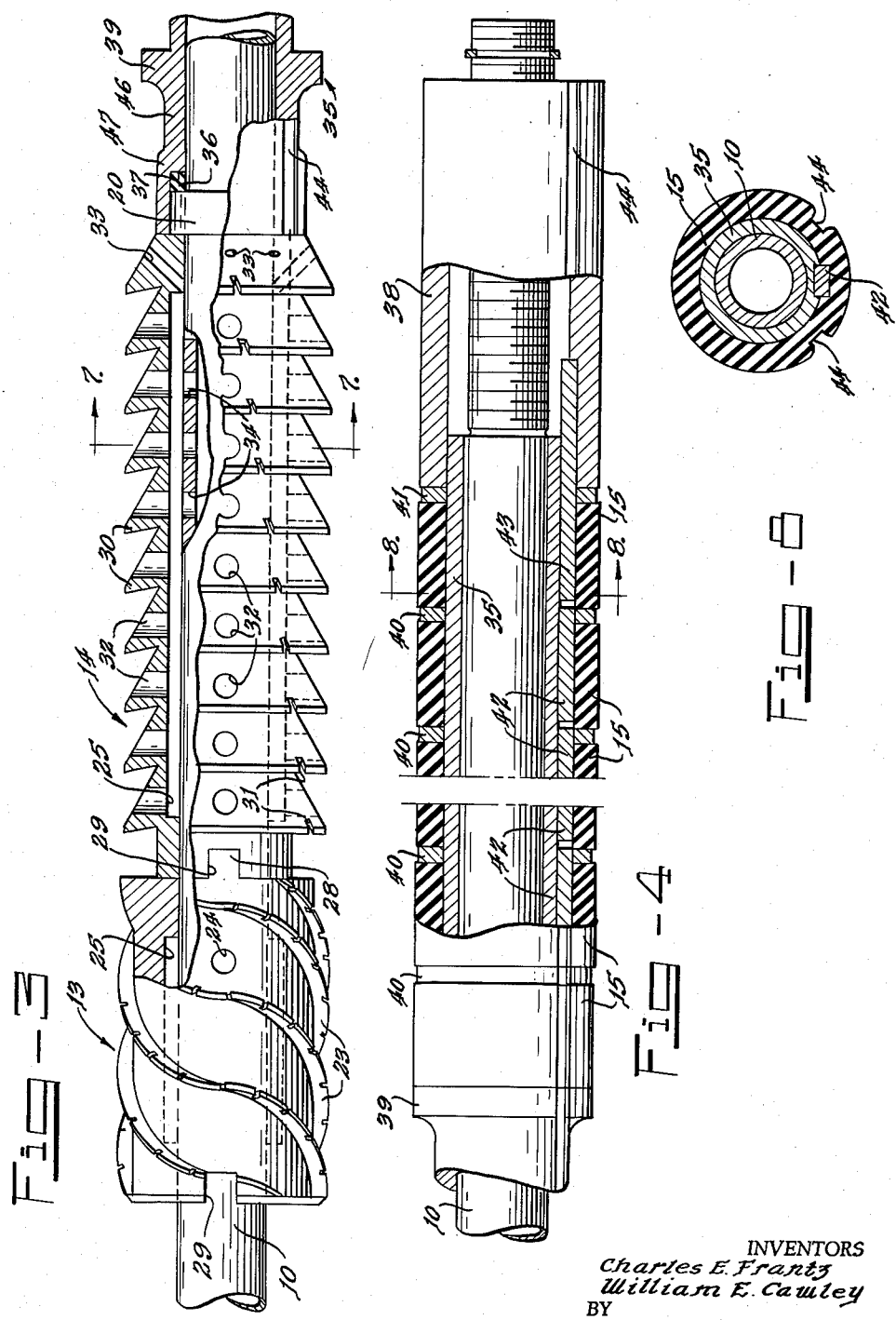

United States Patent Office 2,983,989
Patented May 16, 1961

2,983,989
BROACHING AND TUBE-INSTALLING
APPARATUS

Charles E. Frantz and William E. Cawley, Richland, Wash., assignors to the United States of America as represented by the United States Atomic Energy Commission Filed July 6, 1959, Ser. No. 825,381
1 Claim. (Cl. 29—95.1)

This invention relates to the sizing of long holes in graphite bodies. More specifically, the invention relates to apparatus for broaching a hole in graphite moderator of a nuclear reactor and installing a coolant tube in the hole.

Figs. 37, 38, and 39 and columns 42, 43, and 44 of Fermi et al. Patent 2,708,656, dated May 17, 1955, disclose a nuclear reactor comprising graphite moderator blocks, internally ribbed coolant tubes extending through the moderator, and jacketed slugs of natural uranium laid end to end in the coolant tubes so as to be cooled by water flowing through the tubes and over the slugs. On occasion, the coolant tubes must be replaced, because they have become damaged by overheating or by growth of the fuel elements. When a new coolant tube is to be installed in a hole in the graphite moderator blocks, the hole must be sized or repaired because of shrinking or distortion of the hole due to graphite growth resulting from reactor operation.

The apparatus of the present invention is specially suited to sizing holes in graphite moderator blocks. The apparatus is of the shearing type to accommodate the low shearing strength of graphite. Only a low pulling force is needed to move the apparatus through the holes in the graphite blocks, and so the possibility of shifting the graphite blocks is minimized. Graphite chips formed by the apparatus are sucked out through the apparatus by vacuum.

Also, the present apparatus pulls a new coolant tube into the hole in the graphite blocks at the same time that it sizes and straightens the hole.

In the drawings:

Fig. 1 is a view, partly in section and partly in elevation, showing the apparatus of the present invention sizing a hole in graphite and pulling a coolant tube into the graphite;

Fig. 2 is an elevation, partly in section, of a front portion of the present apparatus;

Fig. 3 is an elevation, partly in section, of a middle portion of the present apparatus;

Fig. 4 is an elevation, partly in section, of a rear portion of the present apparatus;

Fig. 5 is a sectional view taken on the line 5—5 of Fig. 2, showing the connection for pulling the present apparatus;

Fig. 6 is a sectional view taken on the line 6—6 of Fig. 2, showing how chips are sucked out at a spiral broach of the present apparatus;

Fig. 7 is a sectional view taken on the line 7—7 of Fig. 3, showing how chips are sucked out at a straight broach; and Fig. 8 is a sectional view taken on the line 8—8 of Fig. 4, showing a portion of the present apparatus designed to pull the coolant tube into the graphite.

As shown in Fig. 1, the novel apparatus of the present invention comprises a hollow shaft 10, three spiral broach cutting elements 11, 12, and 13 rotatably mounted thereon and keyed to one another, a straight broach cutting element 14 rotatably mounted on the shaft 10 and keyed to the spiral broach cutting elements, and a plurality of neoprene rubber members 15 carried by the shaft 10 and expanded into gripping engagement with the interior of a coolant tube 16. As the present apparatus is pulled through a channel 17 in a mass of graphite 18 from right to left as viewed in Fig. 1, the broach cutting elements 11, 12, 13, and 14 straighten and/or size the channel 17, and the rubber sections pull the coolant tube 16 into the channel 17.

As shown in Figs. 2, 3, and 4, the broach cutting elements 11, 12, 13, and 14 are arranged end to end in that order when considered from the forward end of the shaft 10 so as to fit with little or no longitudinal play between a head 19 connected to the front end of the shaft 10 and shoulder 20 well spaced from the head 19 and also from the rear end of the shaft 10.

As shown in Fig. 2, the head 19 is connected to the shaft 10 by a pin 21, which also connects the shaft to a plug 22 closing the front end of the shaft. As shown in Figs. 2 and 6, the spiral broach cutting element 11 has six spiral rows 23 of teeth and six radial openings 24 communicating with an interior axial recess 25 surrounding the shaft 10 so that only end portions 26 of the spiral broach cutting element 11 engage the shaft 10. The shaft has a radial opening 27 which is about at the lengthwise location of the radial openings 24 in the spiral broach cutting element 11 and provides communication between the interior axial recess 25 in the spiral broach cutting element 11 and the interior of the shaft 10. Graphite chips cut from the channel 17 by the spiral broach cutting element 11 are sucked out through openings 24, recess 25, opening 27, shaft 10, and tube 16 by a vacuum line (not shown) connected with the rear end of tube 16. The broach cutting element 11 is keyed to the broach cutting element 12 by means of two axial, diametrally opposite keys 28 on the broach cutting element 11 and two axial, diametrally opposite recesses 29 in the broach cutting element 12 receiving the keys 28. Fig. 2 shows only one key 28 and one recess 29.

The spiral broach cutting element 12 is like the spiral broach cutting element 11 in having six spiral rows 23 of teeth, six radial openings 24 between the spiral rows 23, an interior axial recess 25, and axial keys 28 received in axial recesses 29 in the spiral broach cutting element 13. Thus, graphite chips cut by the broach cutting element 12 are sucked out through the openings 24, recess 25 an unshown radial opening in shaft 10, the axial hole in shaft 10, and tube 16, and the broach cutting element 12 and 13 are keyed to one another. However, the spiral rows 23 of teeth of the broach cutting element 12 have a greater lead angle and greater diameter than those of broach cutting element 11. For example, the spiral rows 23 of broach cutting element 11 have a lead angle of 15° and taper from a diameter of 1.725" at the end next to head 19 to a diameter of 1.730" at the end next to broach cutting element 12, whereas spiral rows 23 of broach cutting element 12 have a lead angle of 30° and taper from a diameter of 1.730" at the end next to broach cutting element 11 to a diameter of 1.735" at the end next to broach cutting element 13.

As shown in Fig. 3 the spiral broach cutting element 13 is like spiral broach cutting elements 12 and 11 in having six spiral rows 23 of teeth, six radial openings 24 between the spiral rows 23, an interior axial recess 25, and axial keys 28 received in axial recesses 29 in the straight broach cutting element 14, thus graphite chips cut by the broach cutting element 12 are sucked out through openings 24, recess 25, an unshown radial opening in shaft 10, the axial hole in shaft 10, and tube 16, and the broach cutting elements 13 and 14 are keyed to one another. However, the spiral rows 23 of broach cutting element 13 have a greater lead angle and greater diameter than those of broach cutting elements 11 and 12. For example, the spiral rows 23 of broach cutting element 13 have a lead angle of 45° and taper from a diameter of 1.735" at the end next to broach cutting element 12 to a diameter of 1.740" at the end next to broach cutting element 14.

As shown in Fig. 3, the straight broach cutting element 14 has a plurality of circular teeth 30 each divided into four sections by notches 31, which are four in number and spaced 90° from one another for each tooth and are staggered from one tooth to the next tooth. As shown in Figs. 3 and 7, all teeth 30 but the rearmost one have four radial openings 32 communicating with the interior axial recess 25. The rearmost tooth 30 has eight openings 33 which incline forward in communication with the rear end of recess 25. The shaft 10 at the recess 25 in the straight broach cutting element 14 has a plurality of radial openings 34 which are spaced along the shaft 10. Chips cut by the broach cutting element 14 are sucked out through the openings 32 and 33, recess 25, openings 34, shaft 10, and tube 16. The teeth 30 may be ten in number and will increase in diameter from front to rear, for example, from 1.725" to 1.740". Thus, the diameter of teeth 30 of straight broach cutting element 14 varies from the minimum tooth diameter of spiral broach cutting elements 11, 12 and 13 to the maximum tooth diameter of these spiral broach cutting elements.

To the rear of the straight broach cutting element 14, a sleeve 35 is mounted on the shaft 10 and is limited in its movement toward the straight broach cutting element 14 by the shoulder 20 in the shaft 10 and a washer 36 which is clamped between the shoulder 20 and an internal shoulder 37 of the sleeve 35. A sleeve nut 38 has threaded engagement with the rear end of the shaft 10. The sleeve nut 38 extends over the rear end of the sleeve 35 and clamps, against an external shoulder 39 of the sleeve 35, the rubber members 15 and spacing washers 40 and 41. The rubber members 15 and washers 40 and 41 are mounted on the sleeve 35 and are keyed thereto by keys 42 and 43, which as shown in Figs. 4 and 8, are part of the washers 40 and 41 and fit in longitudinal grooves in the sleeve 35 and the rubber members 15. Each key 42 extends to only one side of the associated washer 40. The key 43 extends to both sides of the washer 41. The sleeve nut 38, washers 40 and 41, rubber members 15, and shoulder 39 on the sleeve 35 have two longitudinal grooves as indicated in Fig. 8 for grooves 44 on one of the rubber members 15. These grooves accommodate two unshown internal longitudinal ribs of the tube 16.

At the start of operations, the tube 16 is applied over the sleeve nut 38, the rubber members 15, and the sleeve 35 into abutment with an external shoulder 39 thereon. The rubber members 15 are expanded into gripping engagement with the interior of the tube 16 by longitudinal compression of the members, produced by longitudinal adjustment of the sleeve nut 38 to the left as viewed in Fig. 4. Adjustment of the sleeve 38 is produced by rotation of the shaft 10, for example, by means of a wrench applied to the head 19. For the adjustment of the sleeve nut 38 to occur, it must be held against rotation. This is done by gripping of the tube 16 which is keyed to the sleeve nut 38 by the internal ribs on the tube 16 and the longitudinal grooves on the sleeve nut receiving the internal ribs.

The apparatus of the present invention is pulled through the channel 17 by a cable or rod 45 attached to the head 19. One of the three spiral broach cutting elements 11, 12, and 13 will engage the channel 17, which broach cutting element depending on the size of the channel. If the first and smallest broach cutting element, i.e., broach cutting element 11, contacts the channel 17, broach cutting element 11 will cut six spiral grooves. As a result of the cutting action, the broach cutting element 11 will rotate, causing spiral broach cutting elements 12 and 13 to rotate and clean up the grooves cut by the broach cutting element 11. Straight broach cutting element 14 also rotates and completes the clean-up of the grooves. As the sizing or straightening of the channel 17 is completed, the tube 16 is pulled into place in the channel.

Because the broach cutting elements 11, 12, 13, and 14 can rotate, the possibility of shifting the blocks that form the graphite mass 18 is minimized. Since graphite has a low shear strength, the broach cutting elements are well suited by their shearing action in rotation to size or straighten the channel 17.

The taper of each spiral broach cutting element 11, 12, or 13 is used to cause it to act as a taper reamer, cutting along its entire length with a shaving action. This gives a better finish, as well as distributing the reactive force from the cut along the entire length of the spiral broach cutting element. The graphite is relatively weak in resisting tensional forces and would probably split if subjected to several single heavy ones, such as would result if the spiral broach cutting elements were not tapered. If they were not tapered, the cut would be concentrated mostly at the tip of each flute, resulting in rather heavy forces at that point.

The straight broach cutting element 14 is also tapered, so it too shaves many thin cuts, rather than several heavy ones. It should be noted that the straight broach cutting element 14 only cuts the small ridges left by the last spiral broach cutting element 13. The rifling-like ridges are only left if the last spiral broach cutting element only is cutting. If the first or second of the spiral broach cutting element 11 and 12 has met resistance, they are rifling in the channel, causing the spiral broach cutting elements 12 and/or 13, in effect, to rotate relative to the graphite and so act as spiral reamers.

The sleeve 35 has an external annular depression 46 located between the external shoulder 39 and another external shoulder 47, which is lower than shoulder 39. The depression 46 acts as a receptacle for small chips, etc., that might get by the broach cutting elements 11–14. These chips move past the low shoulder 47 and are trapped in the depression 46 so as not to become caught between the graphite mass 18 and the soft aluminum coolant tube 16 being installed, and so will not score or scratch the exterior of the coolant tube 16.

Because the present apparatus not only processes the graphite channel 17 but also installs the coolant tube 16 therein, it dispenses with the need for a separate tube-installing apparatus.

The provision of holes in the broach cutting elements and in the mounting shaft 10 enables the chips produced by the use of the broach cutting elements to be sucked out by vacuum through the broach cutting elements, shaft, and the tube 16.

The intention is to limit the invention only within the scope of the appended claim.

What is claimed is:

A sizing device comprising a shaft, three broach cutting elements having a plurality of spiral rows of cutting teeth thereon, a straight broach cutting element, the said broach cutting elements being rotatably mounted on said shaft and being keyed to one another in end to end relation with the straight broach cutting element at one end of said shaft, the said spiral toothed broach cutting elements when considered in a direction toward the said straight broach cutting element from the spiral broach cutting element farthest from the said straight broach cutting element increasing in diameter and the lead of the spiral of the said rows of teeth of each said spiral tooth broach cutting element successively increasing in lead angle, the said straight broach cutting element when considered in the same direction increasing in diameter from that of said spiral broach cutting element farthest from said straight broach cutting element to that of said spiral broach cutting element nearest said straight broach cutting element, and means for retaining said broach cutting elements on said shaft and substantially preventing axial movement of said broach cutting elements on said shaft.

References Cited in the file of this patent

UNITED STATES PATENTS

| | | |
|---|---|---|
| 1,089,376 | Hanson | Mar. 3, 1914 |
| 2,093,202 | Maynes | Sept. 14, 1937 |
| 2,140,146 | Tautz | Dec. 13, 1938 |
| 2,292,900 | Schmidt | Aug. 11, 1942 |
| 2,430,733 | Paxson | Nov. 11, 1947 |
| 2,811,204 | Kritzer | Oct. 29, 1957 |